US008377411B2

(12) United States Patent
Barker et al.

(10) Patent No.: US 8,377,411 B2
(45) Date of Patent: Feb. 19, 2013

(54) PREPARATION OF LITHIUM SULFIDE

(75) Inventors: Jeremy Barker, Oxfordshire (GB); Emma Kendrick, Hampshire (GB)

(73) Assignee: ITI Scotland Limited, Glasgow (GB)

( * ) Notice: Subject to any disclaimer, the term of this patent is extended or adjusted under 35 U.S.C. 154(b) by 13 days.

(21) Appl. No.: 13/124,035

(22) PCT Filed: Oct. 6, 2009

(86) PCT No.: PCT/GB2009/051313
§ 371 (c)(1),
(2), (4) Date: Apr. 13, 2011

(87) PCT Pub. No.: WO2010/043885
PCT Pub. Date: Apr. 22, 2010

(65) Prior Publication Data
US 2011/0206600 A1    Aug. 25, 2011

(30) Foreign Application Priority Data

Oct. 14, 2008  (GB) .................................. 0818758.5

(51) Int. Cl.
*C01D 15/00* (2006.01)
(52) U.S. Cl. .................................................... 423/566.2
(58) Field of Classification Search ................ 423/566.2
See application file for complete search history.

(56) References Cited

U.S. PATENT DOCUMENTS

| 2,106,952 | A | * | 2/1938 | Konig | ........................ 423/566.2 |
| 4,126,666 | A | * | 11/1978 | Jacob et al. | ................ 423/566.2 |
| 2005/0118093 | A1 | * | 6/2005 | Senga et al. | ................ 423/566.2 |

* cited by examiner

*Primary Examiner* — Timothy Vanoy
(74) *Attorney, Agent, or Firm* — Tram Anh Nguyen

(57) ABSTRACT

The present invention provides a convenient process for making lithium sulfide involving heating one or more lithium-containing compounds and sulphur, wherein the heating step is performed at a temperature of 600 to 1500° C.

6 Claims, No Drawings

US 8,377,411 B2

PREPARATION OF LITHIUM SULFIDE

CROSS-REFERENCE TO RELATED APPLICATIONS

This application is a United States national phase application under 35 U.S.C. §371 of International Patent Application No. PCT/GB2009/051313 filed on Oct. 6, 2009, and claims the benefit of Great Britain Patent Application No. 0818758.5 filed on Oct. 14, 2008, both of which are herein incorporated in their entirety by reference. The International Application was published as International Publication No. WO 2010/043885 on Apr. 22, 2010.

FIELD

The present invention relates to the preparation of lithium sulfide.

BACKGROUND

Lithium ion batteries are secondary batteries that comprise an anode (negative electrode), a cathode (positive electrode) and an electrolyte material. They operate by the transfer of lithium ions between the anode and the cathode, and they are not to be confused with lithium batteries, which are characterised by containing metallic lithium. Lithium ion batteries are currently the most commonly used type of rechargeable battery and typically the anode comprises an insertion material, for example carbon in the form of coke or graphite. An electroactive couple is formed using a cathode that comprises a lithium-containing insertion material. Typical lithium-containing insertion materials are lithium cobalt oxide ($LiCoO_2$), lithium nickel oxide ($LiNiO_2$) and lithium manganese oxide ($LiMn_2O_4$). In its initial condition, this type of cell is uncharged, therefore to deliver electrochemical energy the cell must be charged to transfer lithium to the anode from the lithium-containing cathode. Upon discharge, the lithium ions are transferred from the anode back to the cathode. Subsequent charging and discharging operations transfers the lithium ions back and forth between the cathode and the anode over the life of the battery. A review of the recent developments and likely advantages of lithium rechargeable batteries is provided by Tsutomu Ohzuku and Ralph Brodd in *Journal of Power Sources* 2007.06.154.

Unfortunately, lithium cobalt oxide is a relatively expensive material and the nickel compounds are difficult to synthesize. Not only that, cathodes made from lithium cobalt oxide and lithium nickel oxide suffer from the disadvantage that the charge capacity of a cell is significantly less than its theoretical capacity. The reason for this is that less than 1 atomic unit of lithium engages in the electrochemical reaction. Moreover, the initial capacity is reduced during the initial charging operation and still further reduced during each charging cycle. Prior art U.S. Pat. No. 4,828,834 attempts to control capacity loss through the use of a cathode mainly composed of $LiMn_2O_4$. U.S. Pat. No. 5,910,382 on the other hand, describes another approach using lithium-mixed metal materials such as $LiMPO_4$ where M is at least one first row transition metal. Preferred compounds include $LiFePO_4$, $LiMnPO_4$, $LiCoPO_4$, and $LiNiPO_4$ and mixed transition metal compounds such as $Li_{1-2x}Fe_{1-x}Ti_xPO_4$ or $Li_{1-2x}Fe_{1-x}Mn_xPO_4$ where $0<x<1$.

The use of lithium ion rechargeable batteries is limited by the prohibitive cost of providing the lithium electrode material, particularly in the case of lithium cobalt oxide. Consequently, current commercialisation is restricted to premium applications such as portable computers and mobile telephones. However, it would be highly desirable to gain access to wider markets, for example the powering of electric vehicles and work has been ongoing in recent years to produce materials that maintain the high performance of lithium ion batteries, but which at the same time, are much cheaper to produce. To achieve this goal, it has been suggested, for example in JP Kokai No 10208782 and Solid State Ionics 117 (1999) 273-276), that sulfides may be used in place of oxides, as cathode materials. Although the use of many sulfides achieves less voltage measured against lithium of the corresponding oxides, the capacity of some sulfide-based cathodes, measured in milliampere hours per gram, can be as much as about 3 times greater. Based on this, some sulfide-based cathodes achieve an overall advantage of about 1.5 times in terms of cathode energy density for batteries measured against a lithium metal anode, as compared against their oxide counterparts, and this makes the use of these sulfides a very attractive proposition. For example, in the case of lithium iron sulfide a theoretical capacity of 400 mAhg$^{-1}$ may be obtained with an average operating voltage of 2.2V versus a lithium metal anode.

Thus, lithium-containing transition metal sulfides will be a convenient substitute material for the lithium metal oxides described above, with lithium iron sulfide being already described in the patent literature, for example in U.S. Pat. No. 7,018,603, to be a useful cathode material in secondary cells. The commercialisation of lithium-containing transition metal sulfides will depend largely on their cost of production. Taking lithium iron sulfide as a specific example, the conventional process for making this material is via a solid state reaction in which lithium sulfide ($Li_2S$) and ferrous sulfide (FeS), are intimately mixed together and heated under an inert atmosphere at a temperature of about 800° C. The starting materials ferrous sulfide (FeS) and iron disulfide ($FeS_2$) are relatively inexpensive as they are found as naturally occurring materials, and are dug out of the ground. However, a notable disadvantage of the reaction process is that the other starting material, $Li_2S$, is not only expensive but also highly moisture sensitive. The latter problem in particular has obvious implications for the complexity, and therefore the cost, of storing and handling the starting material, especially for large-scale commercial production. In addition, the kinetics of this reaction are reported in U.S. Pat. No. 7,018,603 to be very slow and it can apparently take up to one month to complete the reaction, thus this route is believed to be highly unfavourable in terms of energy costs and not commercially viable for the production of electrode materials.

As an alternative route for making lithium-containing transition metal sulfides, U.S. Pat. No. 7,018,603 discloses reacting a transition metal sulfide such as FeS with lithium sulfide in a reaction medium comprising molten salt or a mixture of molten salts at high temperature (temperatures of 450° C. to 700° C. are exemplified). The preferred molten salts are lithium halides. Whilst this reaction proceeds at a good rate there are still several issues that make it less than ideal. Firstly, the fact it uses $Li_2S$ as a starting material leads to the handling and storage problems described above. Secondly, it is very difficult to separate the reaction medium (molten lithium halide used in 1.5 molar excess) from the desired reaction product other then by solvent extraction, and this type of extraction is expensive. Further, even after rigorous purification as much as 8% of the reaction medium salt is still present in the reaction product, and this level of impurity is detrimental to the charge capacity per gram of lithium iron sulfide.

Given the expense of producing lithium sulfide, it is highly desirable to find further alternative routes for its production, which is simple, energy efficient and produces a clean product.

DETAILED DESCRIPTION OF THE EMBODIMENTS

Thus, the present invention provides a method of producing lithium sulfide comprising the step of heating together one or more lithium-containing compounds and sulfur, wherein the heating step is performed at a temperature of 600 to 1500° C., and further wherein the lithium-containing compounds are selected from one or more of lithium oxide, lithium carbonate, anhydrous lithium hydroxide, lithium hydroxide monohydrate, lithium oxalate, lithium nitrate, and any material that is a precursor for any of these lithium-containing compounds during the heating step.

The temperature of the heating step should not be so high as to cause the sulfur to be lost from the reaction mixture but yet high enough for the reaction with the one or more lithium-containing compounds to occur. A preferred temperature is in the range 650° C. to the decomposition temperature of the lithium-containing compound. The reaction time varies according to reaction temperature and as one might expect, the higher the temperature, the faster the reaction.

Preferably the method of the present invention is carried out under a non-oxidising atmosphere and/or reducing conditions, and further preferably the reducing conditions are provided by one or more reducing gases and/or one or more reducing agents. The one or more reducing gases may be selected from carbon monoxide, hydrogen, reforming gas (mixture of hydrogen and nitrogen), hydrogen sulfide, methane and other gaseous alkanes and the one or more reducing agent may be selected from carbon and any carbonaceous material suitable to provide a source of carbon when heated. Carbon black is a preferred source of carbon.

The sulfur used in the present invention may be generated is derived from one or more of flowers of sulfur, pyrite ($FeS_2$), cobalt sulfide ($CoS_2$) and any other material that generates sulfur upon thermal decomposition.

In a second embodiment, the present invention provides a method of producing lithium sulfide comprising the step of heating together one or more lithium-containing compounds and pyrite, wherein the heating step is performed at a temperature of 500 to 1500° C., and further wherein the lithium-containing compounds are selected from one or more of lithium oxide, lithium carbonate, anhydrous lithium hydroxide, lithium hydroxide monohydrate, lithium oxalate, lithium nitrate, and any material that is a precursor for any of these lithium-containing compounds during the heating step.

Suitable reaction vessels comprise glassy carbon or graphite crucibles that generally have a loose fitting lid, however, a sealed pressurized vessel may also be used. For commercial scale production, it is advantageous to use a continuous process, for example, a rotary tube furnace, although a retort batch process may also be used.

The lithium-containing compounds used in the reaction of the present invention are preferably in the solid-state during the reaction process, this means that the reaction is preferably performed without the use a reaction medium such as a solvent. Advantageously, the reactants are solid materials that are first ground using a ball mill to produce a fine powder that can either be used directly or first pressed into a pellet.

In order to reduce the quantity of impurities formed and to optimise the reaction conditions, it has been found advantageous to add a flux agent, also known as a mineraliser, to the reaction mixture. Flux agents or mineralisers are commonly used in the ceramics industry to lower the reaction temperature and shorten reaction times. Mineralisers such as sodium chloride, borax, lithium chloride, lithium fluoride, sodium fluoride, lithium borate and sodium carbonate are known. The present applicant has found that using a very small amount of a mineraliser. Any alkali metal halide may be used but lithium chloride and lithium iodide are most preferred. Alternatively, sodium carbonate or sodium chloride may be used. The amount of mineraliser found to be beneficial in the present invention is from 1 to 5% by weight of the starting materials, preferably from 1 to 3% by weight and further preferably 1% by weight of the starting materials.

The solid-state preparation of lithium sulfide using the method of the present invention is particularly advantageous for use in the preparation of lithium transition metal sulfides. There is no need to isolate the lithium sulfide formed by the method of the present invention before adding a desired transition metal sulfide to the reaction mixture and then heating it at a temperature in the range 600° C. to 1500° C., preferably in the range 700° C. to 1000° C. Unlike the prior art method described above, this process for making lithium transition metal sulfides does not use a solvent thus it clearly avoids the problems associated with its removal at the end of the reaction process.

What is claimed is:

1. A method of producing lithium sulfide comprising the step of heating together one or more lithium-containing compounds and sulfur, wherein the heating step is performed at a temperature of 600 to 1500° C., further wherein the lithium-containing compounds are selected from one or more of lithium oxide, lithium carbonate, anhydrous lithium hydroxide, lithium hydroxide monohydrate, lithium oxalate, lithium nitrate, and any material that is a precursor for any of these lithium-containing compounds during the heating step, and further wherein the sulfur is derived from one or more of flowers of sulfur, pyrite, or cobalt sulfide.

2. A method of producing lithium sulfide according to claim 1, wherein the reducing conditions are provided by one or more reducing gases and/or one or more reducing agents.

3. A method of producing lithium sulfide according to claim 2, wherein the one or more reducing gases is selected from carbon monoxide, hydrogen, reforming gas (mixture of hydrogen and nitrogen), methane and other gaseous alkanes and the one or more reducing agent is selected from carbon and any carbonaceous material suitable to provide a source of carbon when heated.

4. A method of producing lithium sulfide comprising the step of heating together one or more lithium-containing compounds and pyrite, wherein the heating step is performed at a temperature of 600 to 1500° C., and further wherein the lithium-containing compounds are selected from one or more of lithium oxide, lithium carbonate, anhydrous lithium hydroxide, lithium hydroxide monohydrate, lithium oxalate, lithium nitrate, and any material that is a precursor for any of these lithium-containing compounds during the heating step.

5. A method according to claim 4, further comprising the addition of one or more mineralisers in a total amount of from 1 to 5% by weight of the starting materials.

6. A method of claim 5 wherein the mineraliser comprises an alkali metal halide.

* * * * *